United States Patent
Tanaka

[19]

[11] Patent Number: 6,141,015

[45] Date of Patent: Oct. 31, 2000

[54] METHOD AND APPARATUS FOR DETERMINING COLLISION BETWEEN VIRTUAL OBJECTS IN A VIRTUAL SPACE

[75] Inventor: Kengo Tanaka, Funabashi, Japan

[73] Assignee: Sharp Kabushiki Kaisha, Osaka, Japan

[21] Appl. No.: 09/034,283

[22] Filed: Mar. 4, 1998

[30] Foreign Application Priority Data

Mar. 4, 1997 [JP] Japan ..................... 9-048329

[51] Int. Cl.[7] ............................................. G06T 15/00
[52] U.S. Cl. ............................................. 345/427; 345/424
[58] Field of Search ............................................. 345/418, 419, 345/427, 424, 420

[56] References Cited

U.S. PATENT DOCUMENTS

| | | | |
|---|---|---|---|
| 5,123,084 | 6/1992 | Prevost et al. | 345/420 |
| 5,268,997 | 12/1993 | Funaki | 345/427 |
| 5,349,533 | 9/1994 | Libby | 364/461 |
| 5,442,734 | 8/1995 | Murakami et al. | 345/427 |
| 5,513,303 | 4/1996 | Roberston et al. | 345/427 |
| 5,548,694 | 8/1996 | Gibson | 345/427 |
| 5,574,836 | 11/1996 | Broemmelsiek | 345/427 |
| 5,721,566 | 2/1998 | Rosenberg et al. | 345/156 |

FOREIGN PATENT DOCUMENTS 7-230559  8/1995  Japan .

*Primary Examiner*—Mark Zimmerman
*Assistant Examiner*—Cliff N. Vo

[57] ABSTRACT

A method of determining collision occurring in a virtual space generated by a system using a computer includes the steps of preparing, for drawing data approximating a virtual object in the virtual space by a plurality of rectangular parallelepipeds, machine readable first shape data for collision determination approximating the virtual object by a plurality of rectangular parallelepipeds smaller in number than rectangular parallelepipeds of the drawing data, and determining, as a prescribed point moving in the virtual space moves, whether the prescribed point and the virtual object satisfy a predetermined collision condition or not, based on a coordinate of the prescribed point in the virtual space and the first shape data, by computer calculation. An apparatus for implementing this method is also disclosed.

30 Claims, 7 Drawing Sheets

DATA FROM SENSORS
AND INPUT DEVICES

VIDEO SIGNAL

DATA FROM SENSORS
AND INPUT DEVICES

VIDEO SIGNAL

METHOD AND APPARATUS FOR DETERMINING COLLISION BETWEEN VIRTUAL OBJECTS IN A VIRTUAL SPACE

BACKGROUND OF THE INVENTION

1. Field of the Invention

The present invention relates to a method and an apparatus for determining occurrence of a collision of virtual objects in a virtual space generated by a virtual reality generating apparatus. More specifically, the present invention relates to a method and an apparatus for determining whether a collision between virtual objects or a collision of a virtual object and a subject in the virtual space is caused or not by a movement of the virtual objects or by a movement of a view point of the subject in the virtual space.

2. Description of the Background Art

Recently, a virtual reality system (hereinafter referred to as "VRS") have become widely applicable to computer aided education systems, simulators, amusement equipments and so on. In the VRS, a real time compute graphics image generated by a graphic processor is displayed on a Head Mounted Display (hereinafter simply referred to as HMD) with three dimensional sensors. Postures, position, head movement and so on of a subject are sensed by the sensors and based on the sense information, the displayed image is changed on real time basis. In such a VRS, the subject operates various input devices and the subject can move in a three dimensional space created by a computer (virtual space, hereinafter referred to as VR) as if the subject exists in the space.

Objects set in advance may be arranged in the VR (the object will be hereinafter referred to as "virtual object"). When the subject moves in the virtual space, the position of the point of view of the subject changes and, accordingly, the virtual objects looks differently. Thus the subject experiences the VR.

Various virtual objects may be arranged in the space in which the subject may move. The space in which actual movement of the subject is allowed should be regulated by the virtual objects. Therefore, it is essential in the VRS to determine whether the subject collides with a virtual object or not, based on the relation between the present position of the subject and the virtual object. Further, in simulating movement of a certain object (one of the virtual objects) in the virtual space, it is necessary to determine whether or not the certain object collides with another virtual object.

In the VRS, a virtual object is constituted by a number of polygons as shown for example by a chair in FIG. 8A. In a conventional collision determining apparatus, occurrence of a collision between each and every one of the number of polygons constituting the virtual object and the object of interest or the subject is determined. The chair shown in FIG. 8A includes 1277 facets. Therefore, in the prior art, a total of 1277 calculations for determining collision, one for one facet, are necessary for determining collision against only one chair.

Remarkable development in recent three dimensional real time CG (computer graphics) has allowed drawing of a huge number of polygons within a prescribed time period in the VRS. At the time of filing of this application, it is possible to draw several hundreds thousands or several millions of polygons within one second. The polygon drawing performance is closely related to a CG image expression. The larger the number of polygons which can be drawn in a prescribed time period, more real and more natural image display is possible. Current trend is to draw more real models. Therefore, the number of polygons constituting a virtual object tends to be larger.

Further, in this type of system, interactivity is of primary importance. The subject acts on a virtual object displayed in the virtual space, utilizing information input through various input devices and outputs obtained from the sensors. Reaction of the virtual object to the action of the subject is simulated by the VRS, and fed back to the subject in the form of a change in the image. This change or variation of the image recognized by the subject causes the sense as if he or she is actually in the virtual space. For this reason, high response is indispensable in image display of the VRS.

In the real space, when the subject moves in a room, at the point he or she collides against a wall, the subject cannot move further. In order to have the subject moving in the VR experience the same, it is necessary to determine whether the subject collides against other virtual objects, as described above. For this purpose, position of the subject in a virtual room set previously by a three dimensional model is set. How the room looks from the set position is found by geometric calculation. When the subject requests a movement to a certain direction, then an image which would be viewed by the subject at a position after movement is geometrically calculated at an instant, and the image is presented to the subject. The VR must reflect such variation or change on real time basis, and therefore such calculation at an instant (of at most $1/30$ sec.) must be repeated.

When a virtual object such as a desk is placed in the room or a wall of the room overlaps the position of the subject, a process prohibiting further movement of the subject must be completed in the aforementioned instant and fed back to the subject. The manner of feed back may be suppression of image variation, or it may be in the form of reaction force if an apparatus causing reaction force felt by the subject is available. Anyhow, if detection of collision takes much time, feedback to the subject delays. The subject's sense as id the subject is in the space is significantly ruined, and the virtual reality is lost.

As already described, in order to enhance the sense of virtual reality, it is necessary to increase the number of polygons constituting a virtual object. In fact, the number of polygons used in the VRS is ever increasing. This increases the amount of geometric calculation for drawing, as well as the amount of calculation required for determining collision. The larger the number of virtual objects, the larger the amount of calculation. Therefore, in the conventional apparatus which performs collision determination process for every polygon constituting the virtual object (model), the amount of calculation is formidable, resulting in intolerable time of processing.

In order to reduce the amount of calculation in the process of determining collision, a method has been proposed in which one virtual rectangular parallelepiped covering the virtual object of interest is set, and the virtual object of interest is approximated by the rectangular parallelepiped. By this method, occurrence of a collision of a subject (model) against the rectangular parallelepiped is determined. Consider the chair model shown in FIG. 8B. One virtual box surrounding the entire model is set, and collision of a subject model against the box is determined. By such a method, it becomes possible to calculate whether the subject collides against the chair or not, simply by performing calculation for determining the subject model and six facets constituting the virtual box, regardless of the number of polygons drawn.

However, in this method, size of the virtual rectangular parallelepiped for determining collision is defined by the maximum and the minimum coordinate values of respective coordinate axes of the three dimensional coordinate in which the model of the virtual object exists. Therefore, correct determination of collision is not possible when the shape of the model is spatially imbalanced (as in the case of a box-shaped, object having a large cavity). In this case also, the sense of the subject viewing the image would be different from the sense developed by the subject from the fedback result of collision determination, and therefore virtual reality is ruined.

Another proposal for increasing the speed of processing of collision determination and to improve preciseness or correctness of collision determination processing has been made in Japanese Patent Laying-Open No. 7-230559. In the system disclosed in this laid-open application, a virtual object is approximated by a set of three dimensional spheres and whether there is a collision between each of the spheres and a sphere approximating a model of another virtual object (for example, subject) is determined. Since an object is approximated by the simple shape (sphere), the amount of required memory is small and calculation at high speed is possible.

However, since the virtual object is approximated by the set of spheres, there is inevitably a gap between spheres. Such gap may result in erroneous determination of collision. Further, in order to find the view point of the subject and the position of drawing the virtual object after collision between the subject model and the virtual object, it is necessary to calculate reflection vector with respect to the spherical surface in accordance with complex expressions. Therefore even by this system, complicated calculation is unavoidable, and hence the time necessary for calculation is not much reduced.

SUMMARY OF THE INVENTION

Therefore, an object of the present invention is to provide a method and an apparatus for collision determination allowing reduction in time necessary for collision determination and correct collision determination.

Another object of the present invention is to provide a method and an apparatus for collision determination allowing reduction in amount of calculation for collision determination and correct collision determination.

A still another object of the present invention is to provide a method and an apparatus for collision determination allowing reduction in number of polygons to be subjected to collision determination and correct collision determination.

An additional object of the present invention is to provide a method and an apparatus for collision determination allowing reduction in number of polygons to be subjected to collision determination, and not generating any gap between objects constituting a model.

The method of determining a collision occurring in a virtual space generated by a system using a computer in accordance with the present invention includes the following steps of: for drawing data approximating a virtual object in a virtual space by a plurality of rectangular parallelepipeds, preparing machine readable first shape data for determining collision in which the virtual object is approximated by a plurality of rectangular parallelepipeds smaller in number than the rectangular parallelepipeds of the drawing data; and, along with a movement of a prescribed point moving in the virtual space, determining whether the prescribed point and the virtual object satisfy a predetermined collision condition, by computer calculation based on coordinate of the prescribed point in the virtual space and the first shape data.

The virtual object is approximated by the first shape data including rectangular parallelepipeds smaller in number than those constituting the drawing data. Using the first shape data, whether collision condition between the prescribed point and the virtual object is satisfied or not is determined by computer calculation. The amount of calculation is reduced than when the drawing data is used for collision determination. As compared with approximation of the virtual object by one rectangular parallelepiped (or a cube) containing the object, or the virtual object approximated by a plurality of spheres, precision in determination is improved.

Preferably, the prescribed point represents position of a virtual object moving in the virtual space, or a view point set for the user of the system.

More preferably, the method further includes the steps of: preparing machine readable second shape data for collision determination approximating the virtual object by a plurality of rectangular parallelepipeds larger in number than the rectangular parallelepipeds of the machine readable first shape data and smaller in number than the rectangular parallelepipeds of the drawing data; and responsive to determination that the prescribed point and the virtual object satisfy the predetermined collision condition in the step of determination, further determining whether the prescribed point and the virtual object satisfy the predetermined collision condition as the prescribed point moving in the virtual space moves, based on the coordinate of the prescribed point in the virtual space and the second shape data, by computer calculation.

According to another aspect, an apparatus for determining a collision occurring in a virtual space generated by a system using a computer includes: an apparatus for preparing, for drawing data approximating a virtual object in the virtual space by a plurality of rectangular parallelepipeds, machine readable first shape data for collision determination approximating the virtual object by a plurality of rectangular parallelepipeds smaller in number than the rectangular parallelepipeds of the drawing data; and an apparatus for determining, as a prescribed point moving in the virtual space moves, whether the prescribed point and the virtual object satisfy a predetermined collision condition, based on coordinate of the prescribed point in the virtual space and the first shape data, by computer calculation.

Preferably, the prescribed point represents the position of the virtual object moving in the virtual space or the view point set for the user of the system.

The apparatus may further include an apparatus for preparing machine readable second shape data for collision determination approximating the virtual object by a plurality of rectangular parallelepipeds larger in number than the rectangular parallelepipeds of the machine readable first shape data and smaller in number than the rectangular parallelepipeds of the drawing data, and an apparatus responsive to determination by the above described apparatus for determination that the prescribed point and the virtual object satisfy the predetermined collision condition, for further determining, as the prescribed point moving in the virtual space moves, whether the prescribed point and the virtual object satisfy the predetermined collision condition, based on coordinate of the prescribed point in the virtual space and the second shape data, by computer calculation.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1A:
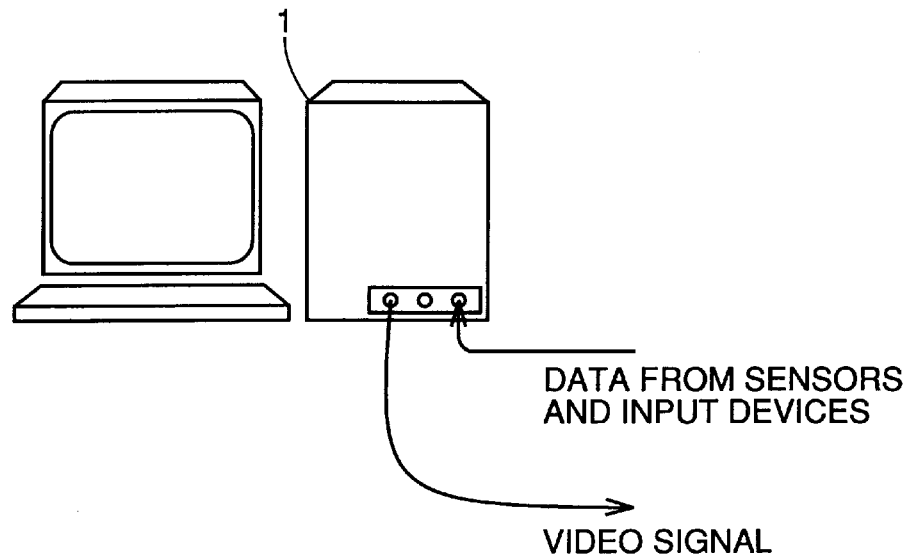
FIGS. 1A and 1B show system configurations of a virtual reality generating apparatus in accordance with a first embodiment of the collision determination processing apparatus of the present invention.
Figure 1B:
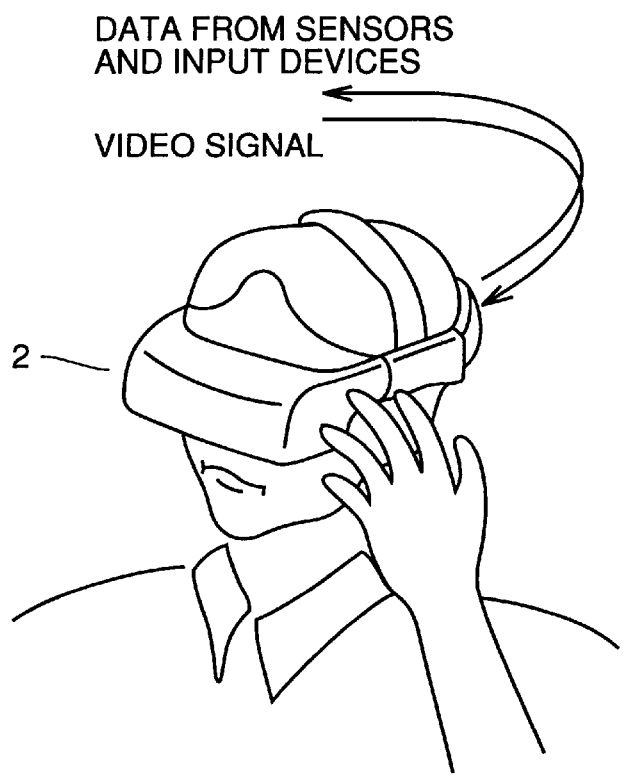

Referring to FIGS. 1A and 1B, the VRS incorporating the collision determination processing apparatus in accordance with the present invention includes a graphic processor 1 for performing device input/output processings necessary for generating a real time CG image, simulation for movement of the model and so on, and an HMD 2 to be mounted on the head of the subject. The collision determination processing apparatus in accordance with the present invention is implemented by a program executed by graphic processor 1.

In the system, an instruction by the subject is applied as data of the sensors and an input device included in HMD 2, to a processing program in graphic processor 1. Graphic processor 1 performs collision determination process, which will be described later, on a virtual object model based on the instruction, a CG image of a virtual three dimensional space from a viewpoint in that three dimensional space is generated based on the result of the collision determination process, and the generated image is applied to HMD 2. HMD 2 presents the three dimensional image to the subject. A common TV monitor may be used in place of HMD 2.

Figure 2A:
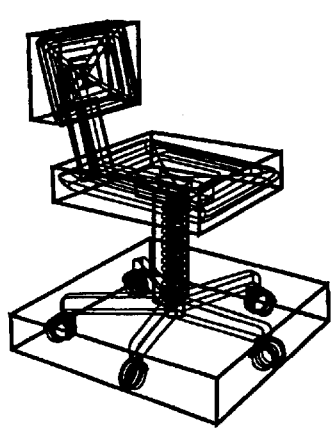
FIGS. 2A and 2B show geometrical shapes for collision determination in accordance with the first embodiment of the collision determination processing apparatus in accordance with the present invention.
Figure 2B:
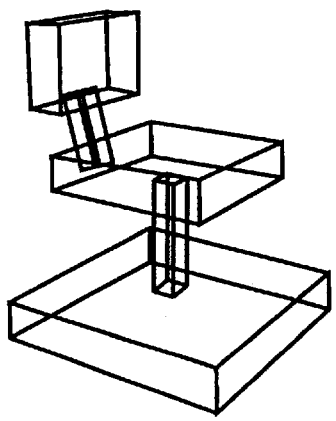

In the following, the method of collision determination in accordance with the present embodiment will be described. In this embodiment, separate from data for drawing, shape data for collision determination which is not actually drawn, including polygons smaller in number than the polygons constituting the data for drawing, are prepared for a virtual object collision with which is to be determined. Collision determination process is performed using the shape data for collision determination. FIG. 2A shows a drawing model for a chair. FIG. 2B shows shape data for collision determination for the model.

Referring to FIG. 2B, the shape data for collision determination includes data defining a plurality of rectangular parallelepipeds roughly approximating the shape of the chair as compared with the data for drawing. The model for collision determination includes 30 polygons. Assuming that the number of polygons for the drawing shape data is 1277 as described above, the number of polygons for collision determination model is about $1/40$. Therefore, the amount of calculation for collision determination can be reduced to about $1/40$ from the amount when drawing shape data is used.

The model for collision determination may be generated by the user using an existing CG modeling tool, in the similar manner as generating the conventional drawing model. Other than the limitations imposed on the ordinary model, there is no specific limitation on the data to be generated. However, a model should be selected carefully so that the amount of calculation is small and correct collision determination is possible.

Figure 3:
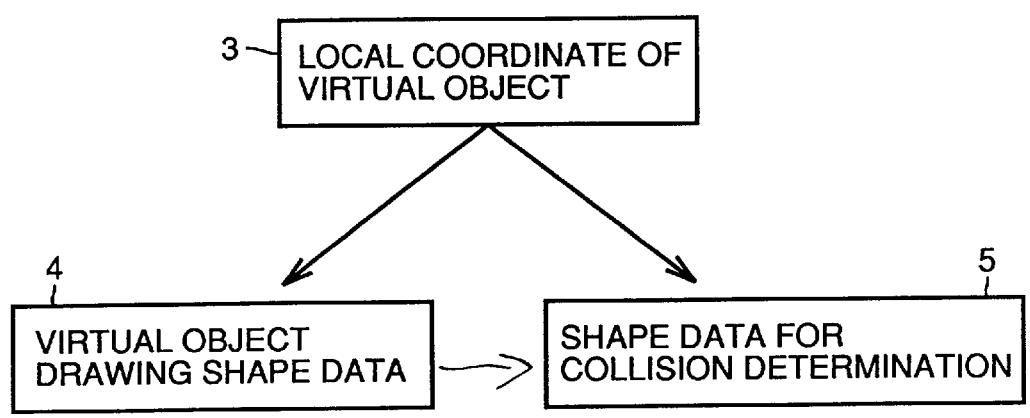
FIG. 3 shows logical data configuration in accordance with the first embodiment of the collision determination processing apparatus in accordance with the present invention.

Referring to FIG. 3, the data configuration utilized in the collision determination processing apparatus in accordance with the present invention has hierarchical configuration. More specifically, data of a certain virtual object includes local coordinate data 3 of the virtual object, three dimensional drawing data 4 for the drawing model corresponding to the local coordinate data 3 as nodes of lower layer, and shape data 5 for the model of collision determination. The shape data 5 for collision determination may automatically be generated from three dimensional drawing shape data 4, using an algorithm for simplifying a three dimensional geometrical shape.

Figure 4:
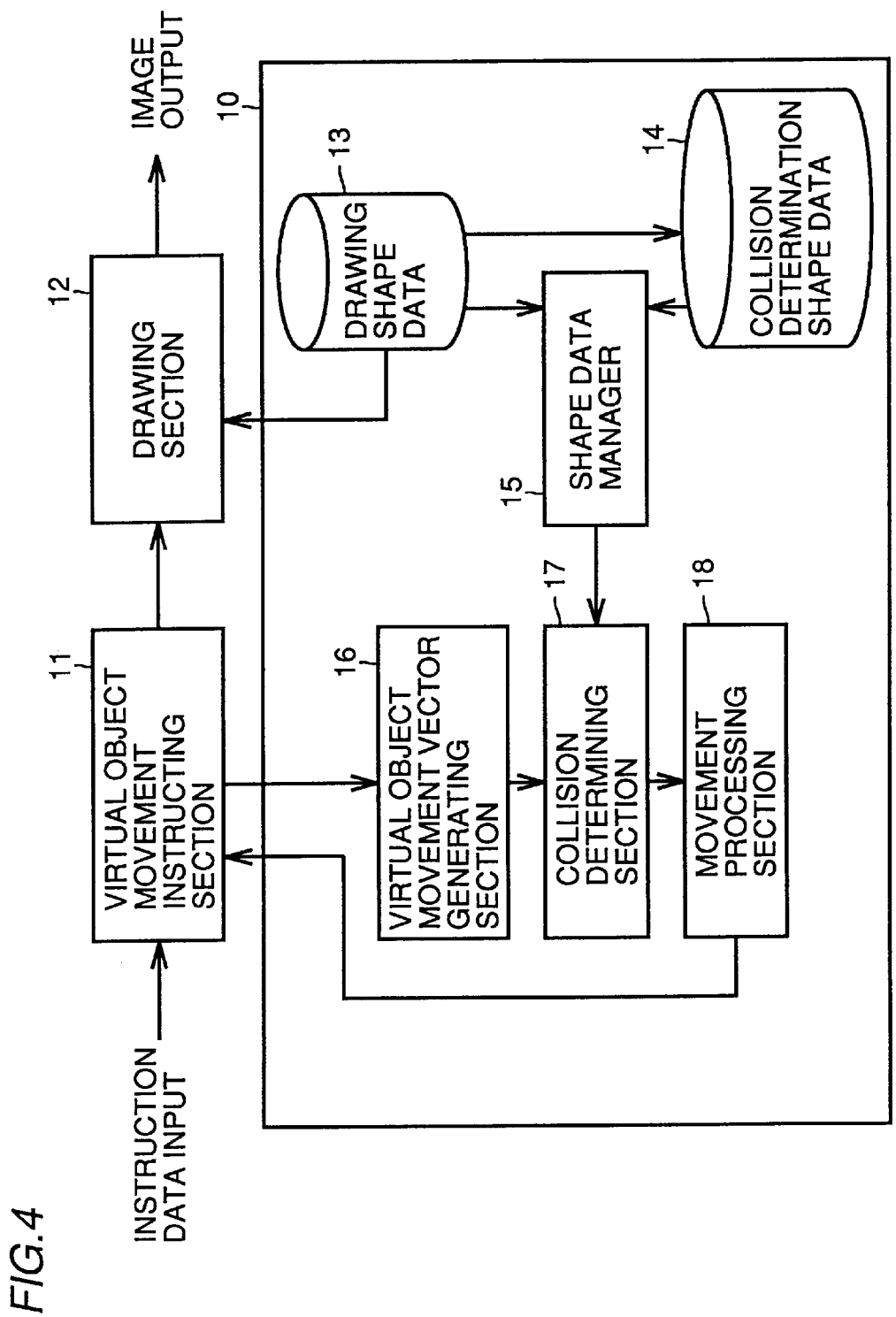
FIG. 4 is a functional block diagram of the first embodiment of the collision determination processing apparatus in accordance with the present invention.

Referring to FIG. 4, the system of the present invention includes, as functional components, a virtual object movement instructing section 11 instructing movement of the virtual object based on user's operation, a drawing section 12 for drawing a CG image after movement of the virtual object based on the instruction from the virtual object movement instruction section 11, and a collision determining section 10 coupled to these sections.

Collision determining section 10 includes a storage 13 for storing the above described drawing shape data, a storage 14 for storing the collision determination shape data, a shape data manager 15 for specifying correspondence between the drawing shape data and the collision determination shape data, a virtual object movement vector generating section 16 for generating a movement vector of the virtual object based on coordinate values before and after the movement of the virtual object from virtual object movement instruction section 11, collision determining section 17 for determining collision against every facet of the collision determination shape data applied from shape data manager 15, using the movement vector generated in this manner as vector for collision determination, and a movement processing section 18 for updating, when the collision determining section 17 detects occurrence of a collision, the local coordinate value of the virtual object by calculating the position of movement of the virtual object after collision. Shape data manager 15 includes a memory, not shown.

Figure 5:
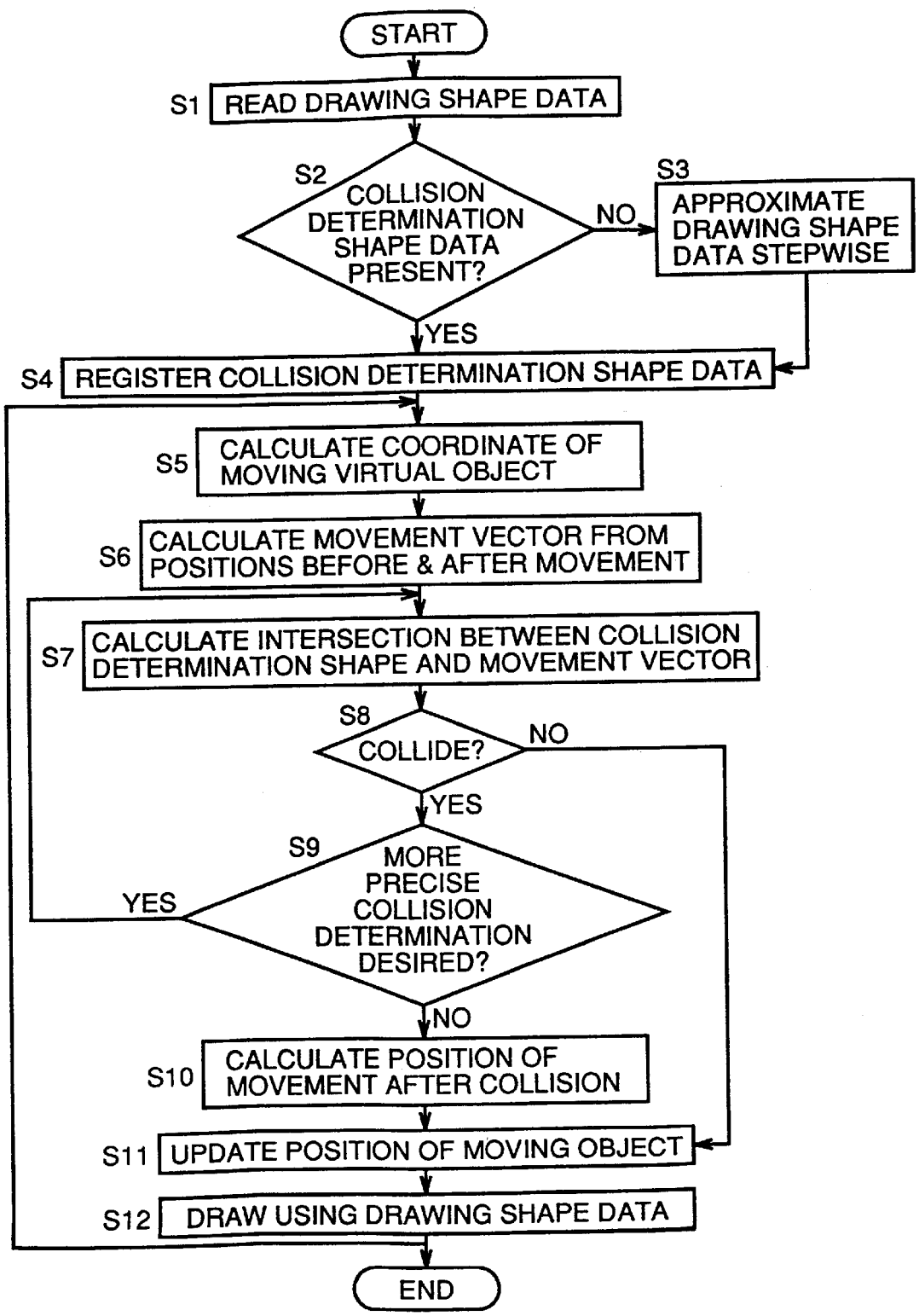
FIG. 5 is a flow chart showing processing in accordance with the first embodiment of the collision determination processing apparatus in accordance with the present invention.

The system, especially the collision determining section 10 operates in the following manner. Referring to FIG. 5, first, the drawing shape data is read from storage 13 to the memory of shape data manager 15. Thereafter, whether or not the collision determination shape data is stored in storage 14 or not is confirmed step S2 and step 3 to step S5. If not, the control proceeds to step 3, where the collision determination shape data is approximated stepwise. Thereafter, control proceeds to step Sb4. If there is the collision determination shape data in step 2, the control directly proceeds to step S4. In step S4, the collision determination shape data is stored in the memory of shape data manager 15.

Virtual object movement instructing section 11 calculates the expected coordinate of the virtual object after movement, based on physical laws of motion ruling a preset three dimensional space step S5. Virtual object movement vector generating section 16 finds movement vector of the virtual object from the coordinate value after movement obtained in this manner and already known coordinate value before movement (step S6). Collision determining section 17 calculates intersection of the collision determination vector and every polygon facet in the collision determination shape data stored in shape data manager 15, using the movement vector obtained in this manner as the collision determination vector.

The intersection is found in accordance with the following principle. Each polygon is defined by 3 vertexes Pi (xi, yi, zi) (where i=1, 2, 3). An expression of a facet corresponding to the polygon is, according to spatial analytical geometry, as follows.

$$\begin{vmatrix} y2-y1 & z2-z1 \\ y3-y1 & z3-z1 \end{vmatrix}(x-x1) + \begin{vmatrix} z2-z1 & x2-x1 \\ z3-z1 & x3-x1 \end{vmatrix}(y-y1) +$$
$$\begin{vmatrix} x2-x1 & y2-y1 \\ x3-x1 & y3-y1 \end{vmatrix}(z-z1) = 0$$

Assume that the collision determination vector is a vector connecting two points, that is, V1 (x4, y4, z4) and V2 (x5, y5, z5) in the space. The expression of a line connecting these two points is, also in accordance with the spatial analytical geometry, as follows.

$$\frac{x-x4}{x5-x4} = \frac{y-y4}{y5-y4} = \frac{z-z4}{z5-z4}$$

These two expressions are solved on the polygon facet and the collision determination vector of interest, and the solution is found to be the coordinate value of the intersection between the polygon facet and the collision determination vector. This calculation may be set in advance as a program, and may be processed by a computer.

Thereafter, whether or not the intersection exists in the polygon region and whether the region determination vector is longer than the vector from the point before movement to the intersection is determined step S8. This is the determination as to whether the collision condition is satisfied. The determination may also be performed by a computer. When it is determined that there is not a collision, there is not a movement of the virtual object caused by the collision. Therefore, the local coordinate value of the virtual object is kept as it is.

When it is determined that a collision occurs, whether a more detailed (precise) collision determination process is necessary or not is determined step S9. If detailed collision determination process is desired, the control returns to step S7, and collision determination process is again performed using collision determination shape data constituted by polygons of which number is larger than the previous data used and smaller than the polygons of the drawing data.

When a collision occurs and it is determined that more precise collision determination process is unnecessary, movement processing section 18 finds the position of movement of the virtual object after collision, based on a prescribed laws of motion step S10. Virtual object movement instructing section 11 updates the local coordinate value of the virtual object (step S11). Based on the updated local coordinate value, drawing section 12 performs CG drawing process using the drawing shape data from storage 13 step S12. In this manner, one collision determination process is terminated. Thereafter, such a process is repeated within the period of a prescribed time period.

In the first embodiment, rough collision determination process is performed using collision determination shape data including a relatively small number of polygons and more precise collision determination process is performed using collision determination shape data including larger number of polygons only on a virtual object which is determined to be satisfying the collision condition as a result of the rough determination. In the first stage, the amount of necessary calculation for collision determination is reduced as the number of polygons to be calculated is small. Further, since more precise collision determination is performed in the second stage, collision determination with higher reliability is possible as compared with the determination of the first stage only.

The operation of collision determination described above is only an example of the method of calculation. The method and apparatus of collision determination in accordance with the present invention may be implemented using a method of calculation different from the operation described above.

The collision determination processing apparatus in accordance with the first embodiment of the present invention performs collision determination as a virtual object moves. The present invention is also applicable to collision determination between a subject and a virtual object as the viewpoint of the subject moves. The second embodiment of the present invention adapted for such an application will be described with reference to FIGS. 6 and 7, in which portions corresponding to those of the collision determination processing apparatus in accordance with the first embodiment shown in FIGS. 1A to 5 will be denoted by the same reference characters and referred to by the same names. Therefore, detailed description thereof is not repeated here.

Figure 6:
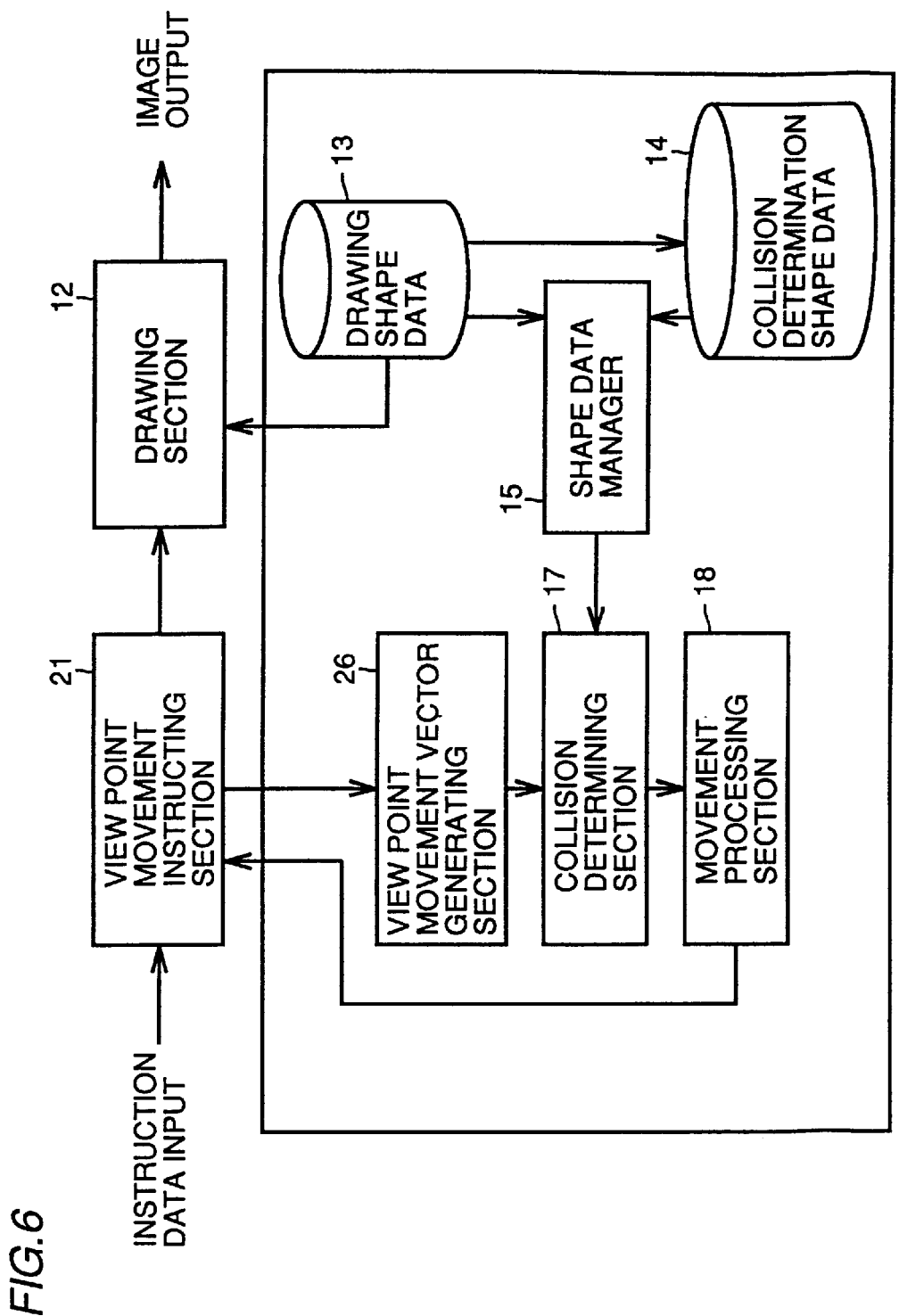
FIG. 6 is a functional block diagram of a second embodiment of the collision determination processing apparatus in accordance with the present invention.

Referring to FIG. 6, the collision determination processing apparatus in accordance with the second embodiment differs from the apparatus of the first embodiment in that a viewpoint movement instructing section 21 instructing movement of the viewpoint of a subject based on data from various sensors for detecting the direction of the viewpoint of the subject and on the data from input devices is provided in place of virtual object movement instructing section 11 shown in FIG. 4. Further, in the second embodiment, a viewpoint movement vector generating section 26 for calculating movement vector of the viewpoint of the subject is provided in place of virtual object movement vector generating section 16 shown in FIG. 4.

Figure 7:
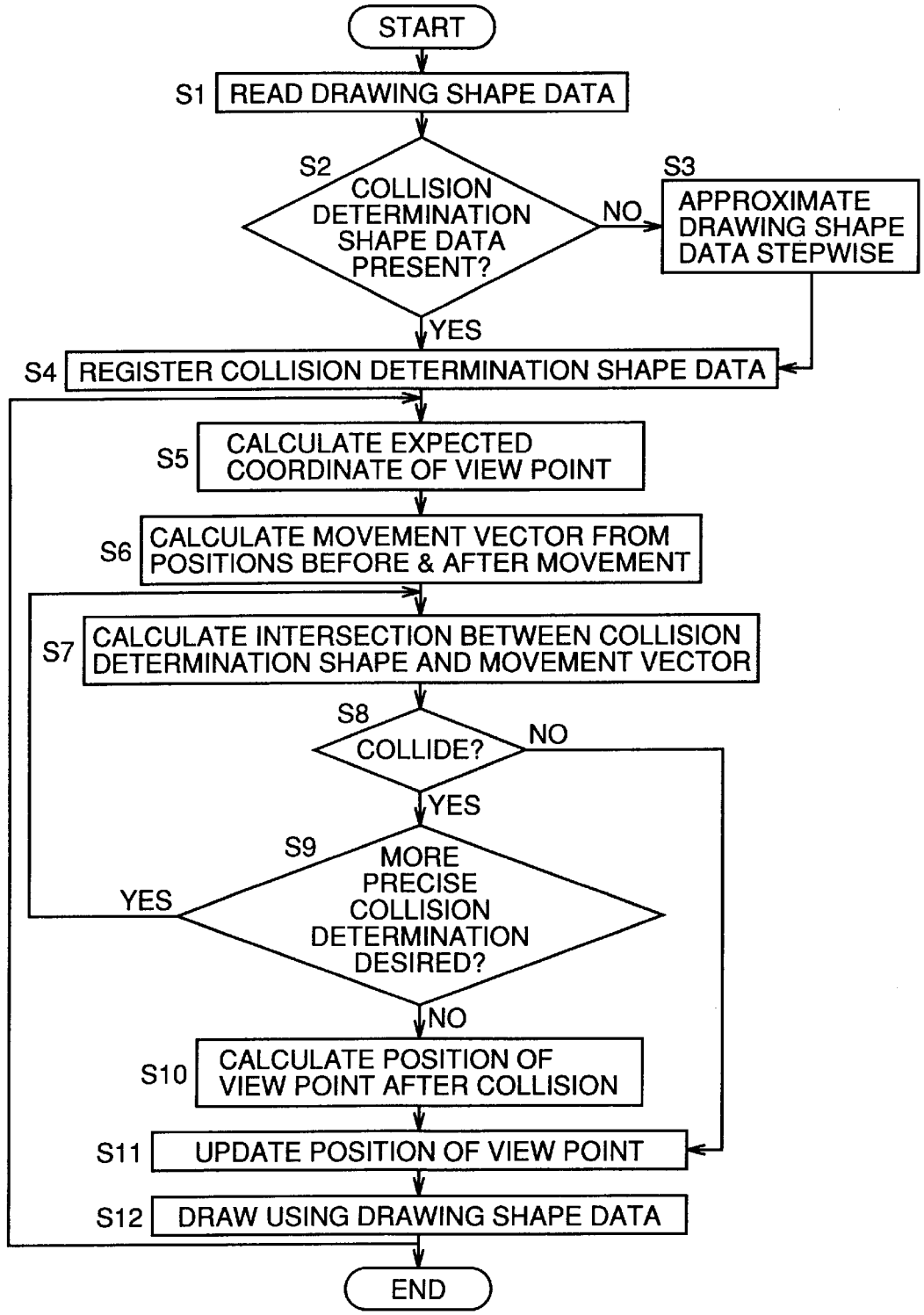
FIG. 7 is a flow chart showing processing in the second embodiment of the collision determination processing apparatus in accordance with the present invention.
Figure 8A:
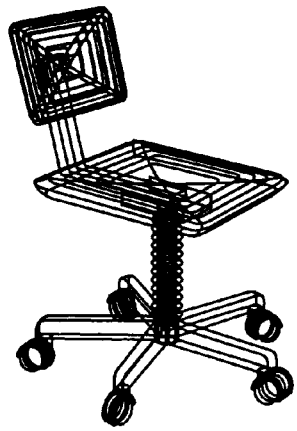
FIGS. 8A and 8B show geometrical shapes for collision determination used in the conventional collision determination processing apparatus.
Figure 8B:
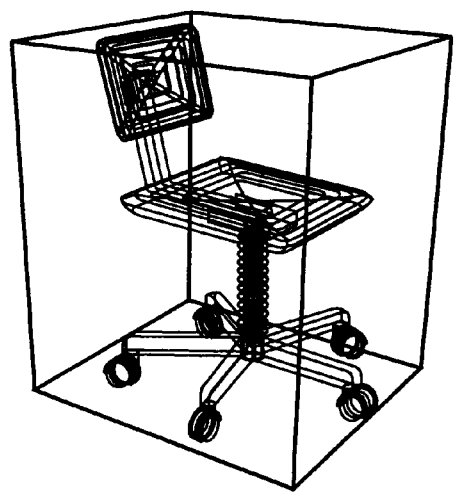

The apparatus of the second embodiment operates in the following manner. Referring to FIG. 7, first, the drawing shape data is read from storage 13 to the memory of shape data manager 15 step S1. Whether collision determination shape data storage 14 stores the collision determination shape data or not is determined step S2. If the collision determination shape data is not stored, the collision determination shape data is generated by stepwise approximation based on the drawing shape data step S3. The collision determination shape data which has been stored in storage 14 or the collision determination shape data generated in step S3 is stored in the memory of shape data manager 15 step S4.

Based on the laws of motion in the three dimensional space set in advance in viewpoint movement instructing section 21 and on data supplied from the input devices and various sensors, an expected coordinate of the viewpoint of the subject after movement is calculated step S5. Viewpoint movement vector generating section 26 finds the movement vector of the viewpoint, from the coordinate values of the viewpoint before and after the movement step S6. Using the movement vector of the viewpoint calculated in this manner is used as the collision determination vector, and an intersection of the vector and every facet of the collision determination shape data stored in shape data manager 15 is calculated by collision determining section 17 step S7.

With the coordinate of the intersection obtained in this manner, it is determined that a collision occurs if the intersection exists in the polygon area and the collision determination vector is longer than the distance from the point before movement to the intersection step S8. When it is determined that there is no collision, movement of the subject is not caused by the collision. Therefore, the position of viewpoint is kept as it is. If it is determined that a collision occurs, whether more precise collision determination process is necessary or not is determined step S9. If more precise collision determination is necessary, control returns to step S7, and collision determination process is again performed using collision determination shape data including larger number of polygons.

If it is determined that the collision occurs and that more precise collision determination process is unnecessary, then the movement processing section finds the position of movement of the viewpoint after collision, based on the laws of motion step S10. The viewpoint position data held in viewpoint movement instructing section 21 is updated by the calculated position data step S11. Thereafter, drawing section 12 performs CG drawing process of the virtual object using the drawing shape data supplied from storage 13 based on the updated viewpoint position step S12, and the process is completed. This process is repeated with the period of a prescribed time period.

As described above, in these embodiments, collision determination process is performed by using collision determination shape data obtained by approximating a drawn shape by a relatively smaller number of rectangular parallelepipeds. As compared with a technique of collision determination process in which each facet of polygons constituting the drawing model is performed, the amount of calculation is far smaller in the present embodiments, and hence time necessary for collision determination is significantly reduced. Further, as compared with a method in which a virtual object is approximated by one virtual box surrounding the entire drawing model, the shape of the virtual object can be approximated with higher precision, and therefore more accurate collision determination process is possible.

Further, different from the method in which a virtual object or the like is approximated by a set of spheres and collision between virtual objects is determined based on determination of collision between spheres, the virtual object is approximated by using a plurality of rectangular parallelepiped in the above described embodiments. Therefore, a gap often observed between spheres does not tend to be generated, and therefore error in collision determination can be reduced. Further, when a view point after collision is to be found and a position of drawing of a virtual object after collision is to be found, a reflection vector representing reflection path of the object or the viewpoint can be found in a simple manner. Therefore, as compared with the method using spheres, CG representation after collision is possible with shorter time of calculation in the embodiments of the present invention.

In either of the above described embodiments, rough collision determination process is performed using the collision determination shape data including relatively small number of polygons and more precise collision determination process is performed using the collision determination shape data including larger number of polygons only when it is determined that there is a collision in the former rough determination. Therefore, the amount of calculation can be reduced and more accurate collision determination is possible. Specially, a virtual object which does not collide can be effectively excluded from the objects of more precise collision determination, with smaller amount of calculation. This means that the collision determination processing apparatus described above is more effective when the number of virtual objects arranged in the virtual space is increased. Here, collision determination may not necessarily be performed in two stages. Only one stage of collision determination may be executed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of determining a collision occurring in a computer-generated virtual space, comprising:

preparing machine readable first shape data for collision determination separate from drawing data which approximates a virtual object in said virtual space by a plurality of interconnected polygonal facets, said first shape data approximating said virtual object with a substantially reduced number of interconnected polygonal facets as compared to those of said drawing data;

preparing machine readable second shape data for collision determination, said second shape data approximating said virtual object with a plurality of interconnected polygonal facets larger in number than those of said first shape data but smaller in number than those of said drawing data; and determining, while a prescribed point defining a movement vector of said virtual object moves in said virtual space, whether said prescribed point and said virtual object satisfy a predetermined collision condition based on an intersection of the movement vector with each of said plurality of polygonal facets of said first shape data in said virtual space.

2. The method according to claim 1, wherein
said prescribed point represents a position of the virtual object moving in said virtual space.

3. The method according to claim 2, further comprising: in the case where said prescribed point and said virtual object satisfy the predetermined collision condition, determining whether said prescribed point and said virtual object satisfy the predetermined collision based on an intersection of the movement vector with each of said plurality of polygonal facets of said second shape data.

4. The method according to claim 3, wherein said plurality of interconnected polygonal facets approximating said virtual object for each of said drawing data, first shape data and second shape data form a corresponding plurality of parallelepipeds for each of said drawing data, first shape data and second shape data, the plurality of parallelepipeds of said second shape data being greater in number than those of said first shape data, but smaller in number than those of said drawing data.

5. The method according to claim 1, wherein said prescribed point represents a position of a viewpoint which is set for a user of a system generating said computer-generated virtual space.

6. The method according to claim 5 wherein, in the case where said prescribed point and said virtual object satisfy the predetermined collision condition, determining whether said prescribed point and said virtual object satisfy the predetermined collision condition based on an intersection of the movement vector with each of said plurality of polygonal facets of said second shape data.

7. The method according to claim 6, wherein said plurality of interconnected polygonal facets approximating said virtual object for each of said drawing data, first shape data and second shape data form a corresponding plurality of parallelepipeds for each of said drawing data, first shape data and second shape data, the plurality of parallelepipeds of said second shape data being greater in number than those of said first shape data, but smaller in number than those of said drawing data.

8. The apparatus according to claim 18 wherein said plurality of interconnected polygonal facets approximating said virtual object for each of said drawing data, first shape data and second shape data form a corresponding plurality of parallelepipeds for each of said drawing data, first shape data and second shape data, the plurality of parallelepipeds of said second shape data being greater in number than those of said first shape data, but smaller in number than those of said drawing data.

9. The method according to claim 1, further comprising: in the case where said prescribed point and said virtual object satisfy the predetermined collision condition, determining whether said prescribed point and said virtual object satisfy the predetermined collision condition based an intersection of the movement vector with each of said plurality of polygonal facets of said second shape data.

10. The method of determining collision according to claim 9, wherein said determining step includes the steps of calculating a vector of movement of said prescribed point in a predetermined time period, and determining whether each of a polygon forming each facet of each of the rectangular parallelepipeds constituting said first shape data intersects with said vector.

11. An apparatus for determining a collision occurring in a computer-generated virtual space, comprising:

means for preparing machine readable first shape data for collision determination separate from drawing data which approximates a virtual object in said virtual space by a plurality of interconnected polygonal facets, said first shape data approximating said virtual object with a substantially reduced number of interconnected polygonal facets as compared to those of said drawing data;

means for preparing machine readable second shape data for collision determination, said second shape data approximating said virtual object with a plurality of interconnected polygonal facets larger in number than those of said first shape data but smaller in number than those of said drawing data; and means for determining while a prescribed point defining a movement vector of said virtual object moves in said virtual space, whether said prescribed point and said virtual object satisfy a predetermined collision condition based on an intersection of the movement vector with each of said plurality of polygonal facets of said first shape data in said virtual space.

12. The apparatus according to claim 11, wherein said prescribed point represents a position of the virtual object moving in said virtual space.

13. The apparatus according to claim 12, further comprising:

means, in the case where said prescribed point and said virtual object satisfy the predetermined collision condition, for determining whether said prescribed point and said virtual object satisfy the predetermined collision condition based on an intersection of the movement vector with each of said plurality of polygonal facets of said second shape data.

14. The apparatus according to claim 13 wherein said plurality of interconnected polygonal facets approximating said virtual object for each of said drawing data, first shape data and second shape data form a corresponding plurality of parallelepipeds for each of said drawing data, first shape data and second shape data, the plurality of parallelepipeds of said second shape data being greater in number than those of said first shape data, but smaller in number than those of said drawing data.

15. The apparatus according to claim 11, wherein said prescribed point represents a position of a view point set for a user of a system generating said computer-generated virtual space, wherein said user is moving in said virtual space.

16. The apparatus according to claim 15, further comprising:

means, in the case where said prescribed point and said virtual object satisfy the predetermined collision condition, for determining whether said prescribed point and said virtual object satisfy the predetermined collision condition based on an intersection of the movement vector with each of said plurality of polygonal facets of said second shape data.

17. The apparatus according to claim 16, wherein said plurality of interconnected polygonal facets approximating said virtual object for each of said drawing data, first shape data and second shape data form a corresponding plurality of parallelepipeds for each of said drawing data, first shape data and second shape data, the plurality of parallelepipeds of said second shape data being greater in number than those of said first shape data, but smaller in number than those of said drawing data.

18. The apparatus according to claim 11, further comprising:

means, in the case where said prescribed point and said virtual object satisfy the predetermined collision condition, for determining whether said prescribed point and said virtual object satisfy the predetermined collision condition based on an intersection of the movement vector with each of said plurality of polygonal facets of said second shape data.

19. The apparatus according to claim 11, further including:

means for defining a law of motion of an object in said virtual space by a machine calculable form in advance; and, when said collision condition is satisfied;

means for calculating a position of movement of said prescribed point after collision in accordance with said law of motion.

20. An apparatus for collision determination in a virtual space, comprising:

a first memory for storing drawing data which approximates a virtual object in said virtual space by a plurality of interconnected polygonal facets;

a second memory for storing first shape data which approximates an outline of said virtual object with a substantially reduced number of interconnected polygonal facets as compared to those of said drawing data, and for storing second shape data which approximates said virtual object with a plurality of interconnected polygonal facets larger in number than those of said first shape data but smaller in number than those of said drawing data; and a collision determining section for determining, while a prescribed point defining a movement vector of said virtual object moves in said virtual space, whether said prescribed point and said virtual object satisfy a predetermined collision condition based on an intersection of said movement vector with each of said polygonal facets of said first shape data.

21. The apparatus of claim 20, further including a vector generating section for generating said movement vector of said virtual object from movement of said prescribed point in said virtual space.

22. The apparatus of claim 20, further including:

a movement processing section for determining a position of movement of the virtual object after collision; and a drawing section for performing CG drawing processing based on said position after collision, said position defined by an updated coordinate value of said virtual object.

23. The apparatus of claim 20, wherein, if more precise collision determination of said prescribed point and virtual object is desired, said collision determining section performs collision determination using said second shape data.

24. The apparatus of claim 23, wherein said determination as to whether said prescribed point and said virtual object satisfy a predetermined collision condition is based on an intersection of said movement vector with each of said polygonal facets of said second shape data.

25. The apparatus of claim 24, further including a shape data manager for reading said second shape data from said second memory for collision determination, wherein said shape data manager includes a separate memory for storing second shape data used for determining said intersection.

26. The apparatus of claim 20, further including a shape data manager for reading said first shape data from said second memory for collision determination, wherein said shape data manager includes a separate memory for storing first shape data used for determining said intersection.

27. The apparatus of claim 20, wherein said prescribed point defines a position of the virtual object moving in said virtual space.

28. The apparatus of claim 20, wherein said prescribed point defines a position of a viewpoint which is set for a user of a system generating the computer-generated virtual space.

29. The apparatus of claim 20, wherein said collision determining section calculates said intersection between said polygonal facets and said movement vector, said calculation being set in advance of collision determination as a program or processed during collision determination by a computer.

30. A method of determining collisions in a computer-generated space, comprising:

providing drawing data which approximates a virtual object in said virtual space by a plurality of interconnected polygonal facets;

providing first shape data which approximates an outline of said virtual object with a substantially reduced number of interconnected polygonal facets as compared to those of said drawing data;

providing second shape data which approximates said virtual object with a plurality of interconnected polygonal facets larger in number than those of said first shape data but smaller in number than those of said drawing data; and determining, while a prescribed point defining a movement vector of said virtual object moves in said virtual space, whether said prescribed point and said virtual object satisfy a predetermined collision condition based on an intersection of said movement vector with each of said polygonal facets of said first shape data.

* * * * *